US011840584B2

(12) United States Patent
Qiu et al.

(10) Patent No.: US 11,840,584 B2
(45) Date of Patent: Dec. 12, 2023

(54) SIMPLE AND GREEN METHOD FOR PREPARATION OF ACID MODIFIED CYCLODEXTRIN

(71) Applicant: Jiangnan University, Wuxi (CN)

(72) Inventors: Chao Qiu, Wuxi (CN); Jinpeng Wang, Wuxi (CN); Yao Hu, Wuxi (CN); Zhengyu Jin, Wuxi (CN); Qianzhu Lin, Wuxi (CN); Yaoqi Tian, Wuxi (CN); Aiquan Jiao, Wuxi (CN); Long Chen, Wuxi (CN); Zhengjun Xie, Wuxi (CN); Xing Zhou, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 0 days.

(21) Appl. No.: 18/122,181

(22) Filed: Mar. 16, 2023

(65) Prior Publication Data
US 2023/0235095 A1 Jul. 27, 2023

Related U.S. Application Data

(63) Continuation of application No. PCT/CN2020/122433, filed on Oct. 21, 2020.

(30) Foreign Application Priority Data

Sep. 17, 2020 (CN) .......................... 202010977713.9

(51) Int. Cl.
C08B 37/16 (2006.01)
B01J 27/18 (2006.01)
(52) U.S. Cl.
CPC ....... C08B 37/0012 (2013.01); B01J 27/1806 (2013.01)
(58) Field of Classification Search
CPC ..... C08B 37/0012; B01J 19/126; B01J 27/14; B01J 27/16; B01J 27/18; B01J 35/02; B01J 2208/024; B01J 2219/0877; B01J 2219/0879
See application file for complete search history.

(56) References Cited

U.S. PATENT DOCUMENTS 6,660,804 B1 * 12/2003 Weltrowski .......... C08G 63/668
524/48
2014/0046061 A1 2/2014 Matos

FOREIGN PATENT DOCUMENTS

| CN | 104628893 A | 5/2015 |
| CN | 104974276 A | 10/2015 |
| CN | 105622962 A | 6/2016 |
| CN | 109836513 A | 6/2019 |

OTHER PUBLICATIONS

Krause RW, et al., Cyclodextrin polymers: Synthesis and application in water treatment. Cyclodextrins: Chemistry and Physics. Transworld Research Network. pp. 185-208. (Year: 2010).*
Huang, Yi et al., Preparation of a novel complex film of Sodium Succinate beta-cyclodextrin ester/Chitosan via electrostatic interaction and its Controlled Drug delivery behavior, Fine Chemicals, vol. 22, No. 1, pp. 44-48, 2005-0115.

* cited by examiner

Primary Examiner — Leigh C Maier
(74) Attorney, Agent, or Firm — IPRO, PLLC; Na Xu

(57) ABSTRACT

The present disclosure discloses a simple preparation method of green acid-modified cyclodextrin, belonging to the field of cyclodextrin modification. Cyclodextrin and succinic acid are mutually modified by an esterification reaction in the presence of catalyst, and acid-modified cyclodextrin with different modification degrees is obtained by controlling reaction time at a high temperature or under a microwave action. The prepared modified cyclodextrin does not involve the use of toxic and harmful reagents, the modification reaction is simple, green and controllable, and the loading capacity of the modified cyclodextrin to guest molecules is remarkably improved compared with the loading capacity of the original cyclodextrin, so that the modified cyclodextrin has great application potential in the health fields such as food, medicines, and cosmetics.

6 Claims, 5 Drawing Sheets

SIMPLE AND GREEN METHOD FOR PREPARATION OF ACID MODIFIED CYCLODEXTRIN

TECHNICAL FIELD

The present disclosure a simple preparation method of green acid-modified cyclodextrin, belonging to the field of cyclodextrin modification.

BACKGROUND

Cyclodextrin is a cyclic oligosaccharide with ahydrophobic interior cavity and a hydrophilic exterior wall. This special molecular structure makes the cyclodextrin have a good loading ability for hydrophobic molecules. Many natural active ingredients and drug molecules have poor water solubility and are not resistant to light, heat, pH and other stimuli, which greatly restricts their applications in functional foods and medicines. Embedding these molecules with special functions in the cyclodextrin cavity can effectively improve their water solubility and stability, thereby further improving their storage period and bioavailability.

In order to improve the embedding effect of the cyclodextrin on hydrophobic guest molecules, chemical modification methods are often used to modify cyclodextrin molecules, so as to improve the sensitivity to recognize the guest molecules by the cyclodextrin, and to improve the embedding rate of the cyclodextrin. However, most of the chemical modification methods involve the participation of toxic and harmful reagents, and the modification process is cumbersome in operation; and the toxic and harmful reagents need to be additionally removed, resulting in higher production costs. Therefore, there is an urgent need to find a simple and effective method for modifying the cyclodextrin without needing the toxic and harmful reagents. This method can effectively broaden the application scope of the cyclodextrin in health industries such as food, medicine, and cosmetics.

SUMMARY

It is an object of the present disclosure to solve the participation of toxic and harmful reagents in cyclodextrin modification methods, so as to broaden the application scope of cyclodextrin in health industries. For this reason, the present disclosure provides a green and simple acid-modified cyclodextrin and a preparation method thereof. The present disclosure adopts a dry-heat reaction method to promote the smooth progress of an esterification reaction, and the method is simple, fast, green, and pollution-free. The obtained acid-modified cyclodextrin has significantly improved cavity activity, thus showing good embedding property for guest molecules.

First of all, the present disclosure provides a preparation method of green acid-modified cyclodextrin. The method uses succinic acid, cyclodextrin and catalyst as raw materials, and the raw materials undergo uniform mixing, a dry-heat reaction, purification, and drying so as to obtain the acid-modified cyclodextrin.

In one embodiment of the present disclosure, the cyclodextrin is α-, β-or γ-cyclodextrin.

In one embodiment of the present disclosure, the catalyst is sodium hypophosphite or sodium dihydrogen phosphate. In one embodiment of the present disclosure, the method specifically includes the following steps:

(1) uniform mixing: mixing the cyclodextrin, the succinic acid and the catalyst evenly;

(2) reaction: performing a dry-heat reaction of the mixture obtained in step (1) at a high temperature or under a microwave action;

(3) purification: dissolving the product obtained after the reaction in step (2) with water, then adding anhydrous ethanol to precipitate the acid-modified cyclodextrin, and washing; and (4) drying: drying the product obtained in step (3) to obtain the purified acid-modified cyclodextrin.

In one embodiment of the present disclosure, the uniform mixing can be achieved by grinding, or by dissolving the cyclodextrin, the succinic acid and the catalyst in water and mixing same evenly to obtain a mixed solution; and then, the mixed solution is dried to obtain a mixture of the cyclodextrin, the succinic acid and the catalyst.

In one embodiment of the present disclosure, in the step of uniform mixing, the drying environment is 60-105° C., and the drying time is 1-24 h.

In one embodiment of the present disclosure, the molar ratio of the cyclodextrin to the succinic acid in step (1) is 1:1-1:10, and the amount of the catalyst added is 10%-200% of the mass of the cyclodextrin.

In one embodiment of the present disclosure, in step (2), the reaction condition and the reaction time at the high temperature are 120-180° C. and 5-50 min, respectively, and the reaction conditions under the microwave action are as follows: the microwave power is 160-800 W, and the reaction time is 15-600 s.

In one embodiment of the present disclosure, the amount of the anhydrous ethanol added in step (3) is 3-10 times the volume of the aqueous solution, the washing times are 2-3 times, and a solvent used for washing is the anhydrous ethanol.

In one embodiment of the present disclosure, the drying method described in step (4) is hot air drying or vacuum drying.

A second object of the present disclosure is to provide the acid-modified cyclodextrin prepared by the above-mentioned preparation method of the green acid-modified cyclodextrin.

A third object of the present disclosure is to provide a curcumin-cyclodextrin inclusion complex containing the above acid-modified cyclodextrin.

In one embodiment of the present disclosure, the curcumin-cyclodextrin inclusion complex is prepared by the following method: adding an ethanol solution of curcumin to a modified cyclodextrin solution, stirring and mixing evenly.

A fourth object of the present disclosure is to provide foods, medicines, and cosmetics containing the acid-modified cyclodextrin.

Compared with the prior art, the present disclosure has the following beneficial effects:

Based on the esterification reaction, the present disclosure adopts a dry-heat reaction method to promote the smooth progress of the esterification reaction between the cyclodextrin and the succinic acid. The preparation process is not only simple, fast, green, and pollution-free, but also can obtain cyclodextrin derivatives with different modification characteristics by controlling the degree of a modification reaction. The acid-modified cyclodextrin prepared by the present disclosure can be dissolved in water, so that the application scenarios of the acid-modified cyclodextrin are expanded; the acid-modified cyclodextrin prepared by the present disclosure is used for embedding guest molecules, and has a higher embedding efficiency compared to the original cyclodextrin; and furthermore, 0.2 mg of curcumin can be embedded in every 20 mg of succinic acid-modified cyclodextrin, and more curcumin can be still retained after 10 days of storage.

DETAILED DESCRIPTION

An embedding capacity test of modified cyclodextrin: methyl orange was used as guest model molecules, the number of active cavities of cyclodextrin was measured by means of spectrophotometry to characterize the embedding capacity of the modified cyclodextrin. The specific steps were as follows: first, the pH of a $9.20*10^{-7}$ mol/L methyl orange aqueous solution was adjusted to 2.8 with concentrated sulfuric acid; 10 ml of the above solution was taken separately in five batches, and 4 mg, 8 mg, 12 mg, 16 mg, and 20 mg of cyclodextrin were added into the five batches of solution, respectively; the obtained mixed solutions were stirred in dark for 3 h, and then the absorbance A was tested at 508 nm; the blank group without cyclodextrin samples was stirred for 3 h, and the absorbance was tested as $A_0$; and a standard curve $y=0.0351x-0.064$, $R^2=0.9999$ of a cyclodextrin-methyl orange inclusion complex was obtained by using $1/(A_0-A)$ as the abscissa x and $1/m_{CD}$ (a reciprocal of cyclodextrin mass) as the ordinate y. Similarly, a 10 mL of methyl orange solution with pH of 2.8 was added into a 20 mg of modified cyclodextrin sample; after the obtained mixed solution was stirred in dark for 3 h, the absorbance of the mixed solution was tested; and the number of the active cavities was calculated as 1/y by substituting the obtained absorbance into the above standard curve formula, indicating that the embedding capacity of the 20 mg of modified cyclodextrin is 1/20y times that of the same amount of original cyclodextrin.

The present disclosure will be further described below in conjunction with examples, but the embodiment of the present disclosure is not limited thereto.

Example 1

(1) Dissolution: 1 g of β-cyclodextrin, 1 g of succinic acid, and 1 g of sodium hypophosphite were completely dissolved with 10 mL of water;

(2) drying: the dissolved mixed solution obtained in step (1) was dried in an oven at 100° C. for 3 h to obtain a dry reactant;
(3) reaction: the reactant dried in step (2) was enabled to react at 140° C. for 12 min to undergo an esterification reaction;
(4) purification: the product obtained after the reaction in step (3) was dissolved with 3 mL of water, 30 mL of anhydrous ethanol was then added to precipitate the modified cyclodextrin, and the product was washed with the anhydrous ethanol for 2 times; and
(5) drying: vacuum drying was performed on the purified acid-modified product obtained in step (4) at 50° C. to obtain succinic acid-modified cyclodextrin.

Figure 1:
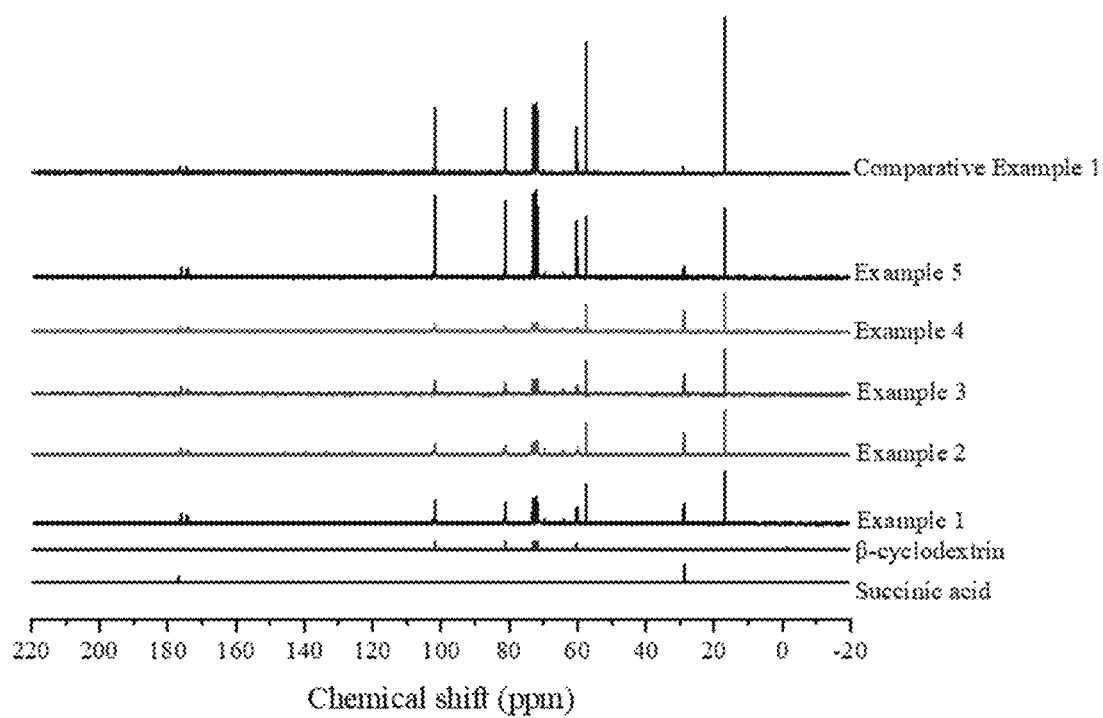
FIG. 1 shows $^{13}$C NMR spectra of succinic acid-modified cyclodextrin prepared in Examples 1-5 and Comparative Example 1 of the present disclosure, β-cyclodextrin, and succinic acid.

The $^{13}$C NMR spectrum of the succinic acid-modified cyclodextrin prepared in this example is shown in FIG. 1. It can be observed that the succinic acid-modified cyclodextrin has a new characteristic peak at 16.68 ppm, which means the formation of ester bonds; the characteristic peak related to carboxyl group C in a succinic acid molecule appears at 176.20 ppm, a new peak (at 174.25 ppm) appears in the low field direction of this peak in this example, this peak is a signal peak of the carboxyl group after esterification, and the area ratio of the above two peaks is about 1, indicating that only one carboxyl group in the succinic acid molecule is esterified, and the modified cyclodextrin is not of a cross-linked structure; and in addition, the chemical shifts corresponding to the characteristic peaks of C atoms No. 2, 3, and 6 in the molecular structure of the cyclodextrin all move to the low field, which means the hydroxyl groups of the above 3 C atoms undergo an esterification reaction with the carboxyl group in the succinic acid molecule, thus verifying the formation of modified cyclodextrin.

Figure 2:
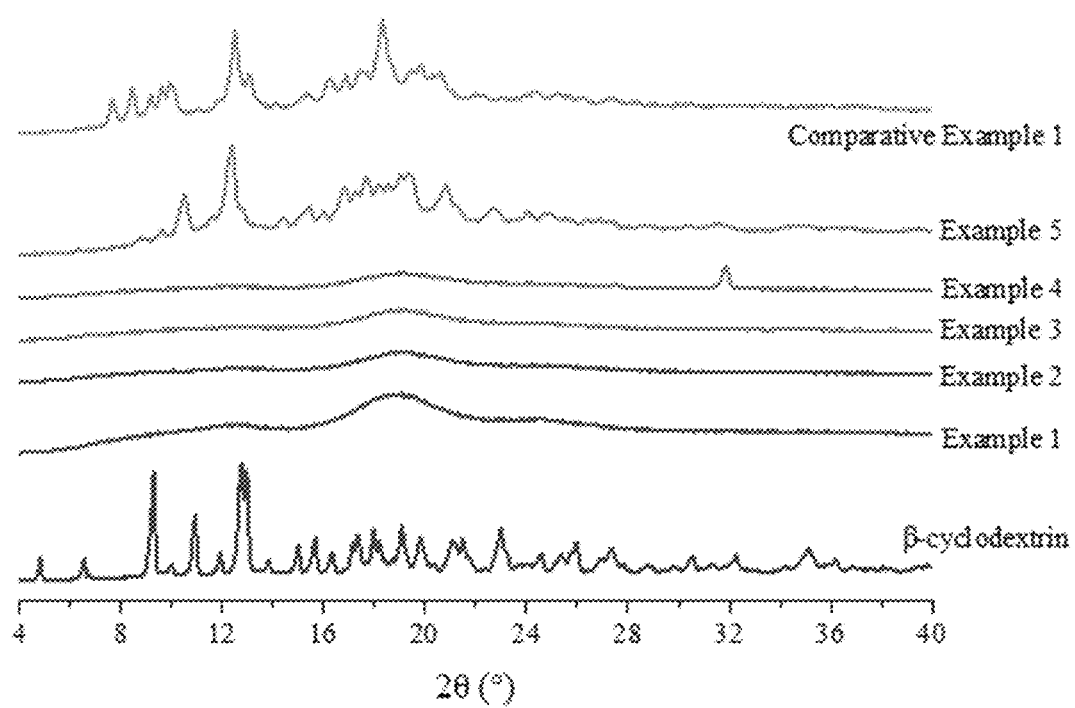
FIG. 2 shows XRD spectra of acid-modified cyclodextrin prepared in Examples 1-5 and Comparative Example 1 of the present disclosure, and β-cyclodextrin.

The XRD spectrum of the succinic acid-modified cyclodextrin prepared in this example is as shown in FIG. 2. It can be seen that the modified cyclodextrin loses its crystallization properties, which verifies the formation of the modified structure from the side.

Figure 3:
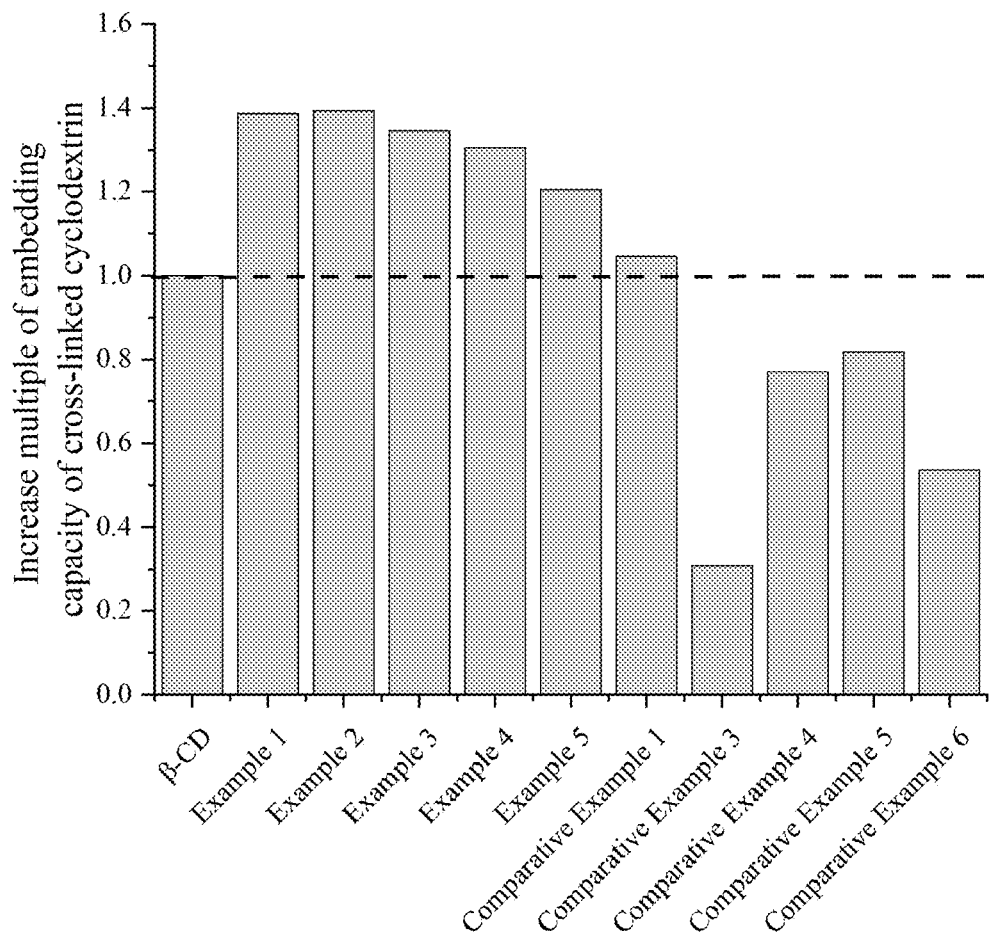
FIG. 3 shows embedding capacity of succinic acid-modified cyclodextrin prepared in Examples 1-5 of the present disclosure, the acid-modified cyclodextrin prepared in Comparative Examples 1 and 3-6, and β-cyclodextrin to guest molecule methyl orange.

The embedding capacity of the succinic acid-modified cyclodextrin prepared in this example for guest molecules is shown in FIG. 3. It can be seen that when methyl orange is used as the guest molecules, the embedding capacity of the cavity of the succinic acid-modified cyclodextrin is 1.387 times that of the cavity of the original cyclodextrin.

Figure 4:
FIG. 4 is a diagram showing an embedding effect of the succinic acid-modified cyclodextrin prepared in Example 1 of the present disclosure, hydroxypropyl-β-cyclodextrin, β-cyclodextrin, and anhydrous ethanol on curcumin.

1 mg/ml of curcumin-ethanol mother liquor was prepared in advance, 20 mg of the succinic acid-modified cyclodextrin prepared in this example was dissolved in 10 mL of water to obtain a succinic acid-modified cyclodextrin solution, 100 μL of curcumin mother liquor was added into the succinic acid-modified cyclodextrin solution, and the mixed solution was stirred in a dark place for 1 h; and curcumin was dispersed in an aqueous solution by being loading in the cyclodextrin cavity, so that a curcumin-cyclodextrin inclusion complex solution was prepared. The excellent embedding capacity of the modified cyclodextrin prepared by the present disclosure was illustrated by using the same method, 10 ml of curcumin mother liquor containing 100 μl and 20 mg of hydroxypropyl were prepared-β-An aqueous solution of cyclodextrin and 10 ml of absolute ethanol containing 100 μl of curcumin mother liquor were used as controls and the results were shown in FIG. 4. It can be seen that compared with the hydroxypropyl-β-cyclodextrin and β-cyclodextrin, the modified cyclodextrin prepared by the present disclosure has a stronger embedding capacity for the curcumin (a darker color indicates that more curcumin is embedded), which is reflected in the better dispersion of the curcumin embedded in the succinic acid-modified cyclodextrin prepared by the present disclosure in water, and the dispersion of the curcumin in a modified cyclodextrin solution is comparable to that in ethanol.

In order to test the maximum solubilizing capacity of the modified cyclodextrin for the curcumin in the aqueous solution, 50 μL, 100 μL, 150 μL, 200 μL, 250 μL, and 300 μL of curcumin mother liquors were separately added to 10 mL of the succinic acid-modified cyclodextrin solution, the mixed solutions were stirred in a dark place for 1 h, and then the absorbance was tested at 429 nm. Finally, it is found that the maximum solubilizing capacity of every 20 mg of succinic acid-modified cyclodextrin for the curcumin in an aqueous solution system is 200 μl, which allows 0.2 mg of the curcumin to be embedded, so that the embedding capacity of the succinic acid-modified cyclodextrin is significantly greater than that of the hydroxypropyl-β-cyclodextrin and the β-cyclodextrin for the curcumin.

Figure 5:
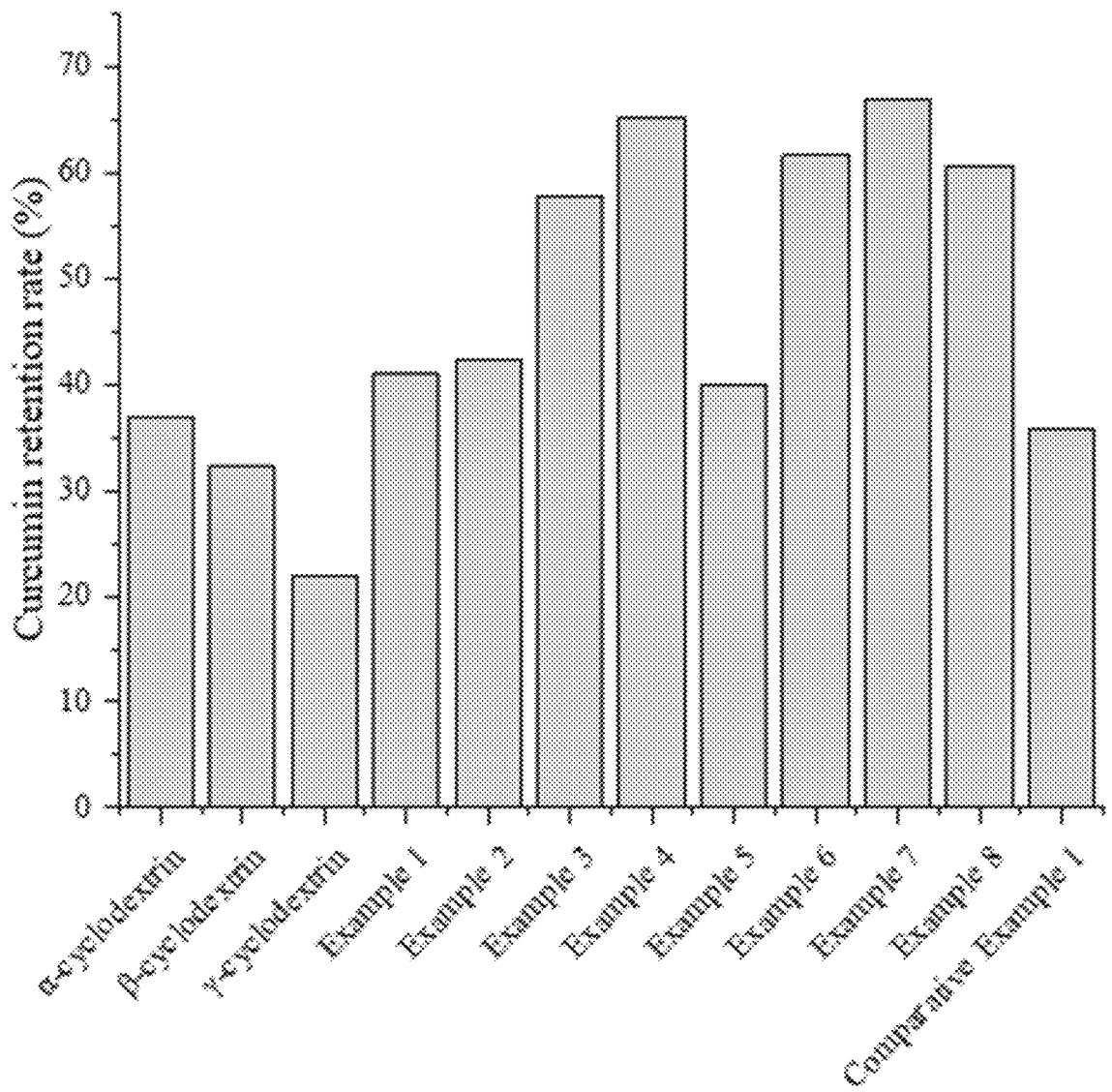
FIG. 5 shows embedding retention rate of the succinic acid-modified cyclodextrin prepared in Examples 1-5 and Comparative Example 1 of the present disclosure, and β-cyclodextrin for curcumin.

As shown in FIG. 5, the curcumin-cyclodextrin inclusion complex solution prepared in this example was left standing for 10 days at the room temperature without shielding from light. After 10 days, it was detected that 40.97% of curcumin remained in the solution. Under the same conditions, when the succinic acid-modified cyclodextrin was replaced with β-cyclodextrin, the prepared curcumin-cyclodextrin inclusion complex solution was left standing for 10 days at the room temperature without shielding from light. After 10 days, it was detected that only 32.30% of curcumin remained in the original cyclodextrin solution. It can be seen that the succinic acid-modified cyclodextrin prepared by the present disclosure has a better embedding capacity for the curcumin, that is, the succinic acid-modified cyclodextrin prepared by the present disclosure is a better active ingredient loading system.

Example 2

(1) Dissolution: 1 g of β-cyclodextrin, 1 g of succinic acid, and 1 g of sodium hypophosphite were completely dissolved with 10 mL of water;
(2) drying: the dissolved mixed solution obtained in step (1) was dried in an oven at 100° C. for 3 h to obtain a dry reactant;
(3) reaction: there actant dried in step (2) was enabled to react at 140° C. for 20 min to undergo an esterification reaction;
(4) purification: the product obtained after the reaction in step (3) was dissolved with 3 mL of water, 30 mL of anhydrous ethanol was then added to precipitate the modified cyclodextrin, and the product was washed with the anhydrous ethanol for 2 times; and
(5) drying: vacuum drying was performed on the purified acid-modified product obtained in step (4) at 50° C. to obtain succinic acid-modified cyclodextrin.

The $^{13}C$ NMR spectrum of the succinic acid-modified cyclodextrin prepared in this example is shown in FIG. 1. It can be observed that the succinic acid-modified cyclodextrin has a new characteristic peak at 16.68 ppm, which means the formation of ester bonds; the characteristic peak related to carboxyl group C in a succinic acid molecule appears at 176.20 ppm, a new peak (at 174.25 ppm) appears in the low field direction of this peak in this example, this peak is a signal peak of the carboxyl group after esterification, and the area ratio of the above two peaks is about 1, indicating that only one carboxyl group in the succinic acid molecule is esterified, and the modified cyclodextrin is not of a cross-linked structure; and in addition, the chemical shifts corresponding to the characteristic peaks of C atoms No. 2, 3, and 6 in the molecular structure of the cyclodextrin all move to the low field, which means the hydroxyl groups of the above 3 C atoms undergo an esterification reaction with the carboxyl group in the succinic acid molecule, thus verifying the formation of modified cyclodextrin.

The XRD spectrum of the succinic acid-modified cyclodextrin prepared in this example is as shown in FIG. 2. It can be seen that the modified cyclodextrin loses its crystallization properties, which verifies the formation of the modified structure from the side.

The embedding capacity of the succinic acid-modified cyclodextrin prepared in this example for guest molecules is shown in FIG. 3. It can be seen that when methyl orange is used as the guest molecules, the embedding capacity of the cavity of the succinic acid-modified cyclodextrin is 1.394 times that of the cavity of the original cyclodextrin. As shown in FIG. 5, after the curcumin-cyclodextrin inclusion complex solution prepared in this example was left standing for 10 days at the room temperature without shielding from light, 42.30% of curcumin still remained in the solution.

Example 3

(1) Dissolution: 4 g of β-cyclodextrin, 4 g of succinic acid, and 4 g of sodium hypophosphite were completely dissolved with 40 mL of water;
(2) drying: the dissolved mixed solution obtained in step (1) was dried in an oven at 100° C. for 3 h to obtain a dry reactant;
(3) reaction: there actant dried in step (2) was enabled to undergo an esterification reaction at a microwave power of 320 W for 45 s;
(4) purification: the product obtained after the reaction in step (3) was dissolved with 12 mL of water, 120 mL of anhydrous ethanol was then added to precipitate the modified cyclodextrin, and the product was washed with the anhydrous ethanol for 2 times; and
(5) drying: vacuum drying was performed on the purified acid-modified product obtained in step (4) at 50° C. to obtain succinic acid-modified cyclodextrin.

The $^{13}C$ NMR spectrum of the succinic acid-modified cyclodextrin prepared in this example is shown in FIG. 1. It can be observed that the succinic acid-modified cyclodextrin has a new characteristic peak at 16.68 ppm, which means the formation of ester bonds; the characteristic peak related to carboxyl group C in a succinic acid molecule appears at 176.20 ppm, a new peak (at 174.25 ppm) appears in the low field direction of this peak in this example, this peak is a signal peak of the carboxyl group after esterification, and the area ratio of the above two peaks is about 1, indicating that only one carboxyl group in the succinic acid molecule is esterified, and the modified cyclodextrin is not of a cross-linked structure; and in addition, the chemical shifts corresponding to the characteristic peaks of C atoms No. 2, 3, and 6 in the molecular structure of the cyclodextrin all move to the low field, which means the hydroxyl groups of the above 3 C atoms undergo an esterification reaction with the carboxyl group in the succinic acid molecule, thus verifying the formation of modified cyclodextrin.

The XRD spectrum of the succinic acid-modified cyclodextrin prepared in this example is as shown in FIG. 2. It can be seen that the modified cyclodextrin loses its crystallization properties, which verifies the formation of the modified structure from the side.

The embedding capacity of the succinic acid-modified cyclodextrin prepared in this example for guest molecules is shown in FIG. 3. It can be seen that when methyl orange is used as the guest molecules, the embedding capacity of the cavity of the succinic acid-modified cyclodextrin is 1.346 times that of the cavity of the original cyclodextrin. As shown in FIG. 5, after the curcumin-cyclodextrin inclusion complex solution prepared in this example was left standing for 10 days at the room temperature without shielding from light, 57.82% of curcumin still remained in the solution; and under the same conditions, only 32.30% of curcumin remained in the original cyclodextrin solution. In this example, the microwave method is used for the reaction, which not only greatly shortens the reaction time, but also allows the prepared modified cyclodextrin product to show better stability for the dispersion of the curcumin in an aqueous solution, thus indicating that the microwave method is an efficient method for the preparation of the modified cyclodextrin; and furthermore, the method is easy to implement in industry, and has broad application prospects.

Example 4

(1) Dissolution: 4 g of β-cyclodextrin, 4 g of succinic acid, and 4 g of sodium hypophosphite were completely dissolved with 40 ml of water;
(2) drying: the dissolved mixed solution obtained in step (1) was dried in an oven at 100° C. for 3 h to obtain a dry reactant;
(3) reaction: there actant dried in step (2) was enabled to undergo an esterification reaction at a microwave power of 480 W for 30 s;
(4) purification: the product obtained after the reaction in step (3) was dissolved with 12 ml of water, 120 ml of anhydrous ethanol was then added to precipitate the modified cyclodextrin, and the product was washed with the anhydrous ethanol for 2 times; and
(5) drying: vacuum drying was performed on the purified acid-modified product obtained in step (4) at 50° C. to obtain succinic acid-modified cyclodextrin.

The $^{13}$C NMR spectrum of the succinic acid-modified cyclodextrin prepared in this example is shown in FIG. 1. It can be observed that the succinic acid-modified cyclodextrin has a new characteristic peak at 16.68 ppm, which means the formation of ester bonds; the characteristic peak related to carboxyl group C in a succinic acid molecule appears at 176.20 ppm,a new peak (at 174.25 ppm) appears in the low field direction of this peak in this example, this peak is a signal peak of the carboxyl group after esterification, and the area ratio of the above two peaks is about 1, indicating that only one carboxyl group in the succinic acid molecule is esterified, and the modified cyclodextrin is not of a cross-linked structure; and in addition, the chemical shifts corresponding to the characteristic peaks of C atoms No. 2, 3, and 6 in the molecular structure of the cyclodextrin all move to the low field, which means the hydroxyl groups of the above 3 C atoms undergo an esterification reaction with the carboxyl group in the succinic acid molecule, thus verifying the formation of modified cyclodextrin.

The XRD spectrum of the succinic acid-modified cyclodextrin prepared in this example is as shown in FIG. 2. It can be seen that the modification reaction for a long time causes cyclodextrin to completely lose its crystallization properties, and the formation of new crystallization peaks may be related to gradually unified degree and position of substitution of succinic acid-modified cyclodextrin, so that the modified molecules are rearranged into a new crystallization structure.

The embedding capacity of the succinic acid-modified cyclodextrin prepared in this example for guest molecules is shown in FIG. 3. It can be seen that when methyl orange is used as the guest molecules, the embedding capacity of the cavity of the succinic acid-modified cyclodextrin is 1.305 times that of the cavity of the original cyclodextrin. As shown in FIG. 5, after the curcumin-cyclodextrin inclusion complex solution prepared in this example was left standing for 10 days at the room temperature without shielding from light, 65.26% of curcumin still remained in the solution; and under the same conditions, only 32.30% of curcumin remained in the original cyclodextrin solution. In this example, the microwave method is used for the reaction, and the further increased retention rate of curcumin in an aqueous solution may be related to the formation of the new crystallization structure in the product, which indicates that the microwave method is an efficient method for the preparation of the modified cyclodextrin; and furthermore, the method is easy to implement in industry, and has broad application prospects.

Example 5

(1) Dissolution: 1 g of β-cyclodextrin, 1 g of succinic acid, and 1 g of sodium hypophosphite were completely dissolved with 10 mL of water;
(2) drying: the dissolved mixed solution obtained in step (1) was dried in an oven at 100° C. for 3 h to obtain a dry reactant;
(3) reaction: there actant dried in step (2) was enabled to react at 140° C. for 8 min to undergo an esterification reaction, the time of the esterification reaction was 12 min;
(4) purification: the product obtained after the reaction in step (3) was dissolved with 3 mL of water, 30 mL of anhydrous ethanol was then added to precipitate the modified cyclodextrin, and the product was washed with the anhydrous ethanol for 2 times; and
(5) drying: vacuum drying was performed on the purified acid-modified product obtained in step (4) at 50° C. to obtain succinic acid-modified cyclodextrin.

The $^{13}$C NMR spectrum of the succinic acid-modified cyclodextrin prepared in this example is shown in FIG. 1. It can be observed that the succinic acid-modified cyclodextrin has a new characteristic peak at 16.68 ppm, which means the formation of ester bonds; the characteristic peak related to carboxyl group C in a succinic acid molecule appears at 176.20 ppm,a new peak (at 174.25 ppm) appears in the low field direction of this peak in this example, this peak is a signal peak of the carboxyl group after esterification, and the area ratio of the above two peaks is about 1, indicating that only one carboxyl group in the succinic acid molecule is esterified, and the modified cyclodextrin is not of a cross-linked structure; and in addition, the chemical shifts corresponding to the characteristic peaks of C atoms No. 2, 3, and 6 in the molecular structure of the cyclodextrin all move to the low field, which means the hydroxyl groups of the above 3 C atoms undergo an esterification reaction with the carboxyl group in the succinic acid molecule, thus verifying the formation of modified cyclodextrin.

The XRD spectrum of the succinic acid-modified cyclodextrin prepared in this example is as shown in FIG. 2. It can be seen that the crystallization properties of the cyclodextrin decrease somewhat, but most of the crystallization structure remains, indicating that the modification occurring under this condition is still slight.

The embedding capacity of the succinic acid-modified cyclodextrin prepared in this example for guest molecules is shown in FIG. 3. It can be seen that the embedding capacity of the slightly modified cyclodextrin for guest molecules is 1.204 times that of the original cyclodextrin. As shown in FIG. 5, after the curcumin-cyclodextrin inclusion complex solution prepared in this example was left standing for 10 days at the room temperature without shielding from light, 40.02% of curcumin still remained in the solution, and under the same conditions, only 32.30% of curcumin remained in the original cyclodextrin solution, which indicates that the slightly modified cyclodextrin in this example improves the dispersibility of curcumin in the aqueous solution somewhat.

Example 6

The β-cyclodextrin in Example 3 was replaced with α-cyclodextrin, and the remaining operating parameters and methods were consistent with those in Example 3, so as to prepare succinic acid-modified cyclodextrin.

When curcumin was used as guest molecules, the maximum solubilizing capacity of every 20 mg of the succinic acid-modified cyclodextrin for the curcumin in an aqueous solution system was 150 μl, which allowed 0.15 mg of the curcumin to be embedded. After the curcumin-cyclodextrin inclusion complex solution prepared in this example was left standing for 10 days at the room temperature without shielding from light, 61.64% of curcumin still remained in the solution; and under the same conditions, only 36.83% of curcumin remained in the original cyclodextrin solution.

Example 7

The β-cyclodextrin in Example 3 was replaced with γ-cyclodextrin, and the remaining operating parameters and methods were consistent with those in Example 3, so as to prepare succinic acid-modified cyclodextrin.

When curcumin was used as guest molecules, the maximum solubilizing capacity of every 20 mg of the succinic acid-modified cyclodextrin for the curcumin in an aqueous solution system was 250 μL, which allowed 0.25 mg of the curcumin to be embedded. After the curcumin-cyclodextrin inclusion complex solution prepared in this example was left standing for 10 days at the room temperature without shielding from light, 66.92% of curcumin still remained in the solution; and under the same conditions, only 21.94% of curcumin remained in the original cyclodextrin solution.

Example 8

The ratio of β-cyclodextrin to succinic acid in Example 3 was changed to a molar ratio of 1:5, and the remaining operating parameters and methods were consistent with those in Example 3, so as to prepare succinic acid-modified cyclodextrin.

When methyl orange was used as guest molecules, the embedding capacity of the cavity of the succinic acid-modified cyclodextrin was 1.449 times that of the cavity of the original cyclodextrin. After the curcumin-cyclodextrin inclusion complex solution prepared in this example was left standing for 10 days at the room temperature without shielding from light, 60.68% of curcumin still remained in the solution; and under the same conditions, only 32.30% of curcumin remained in the original cyclodextrin solution.

Comparative Example 1

(1) Dissolution: 1 g of β-cyclodextrin, 1 g of succinic acid, and 1 g of sodium hypophosphite were completely dissolved with 10 mL of water;

(2) drying: the dissolved mixed solution obtained in step (1) was dried in an oven at 100° C. for 3 h to obtain a dry reactant;
(3) reaction: there actant dried in step (2) was enabled to react at 140° C. for 4 min to undergo an esterification reaction;
(4) purification: the product obtained after the reaction in step (3) was dissolved with 3 mL of water, 30 mL of anhydrous ethanol was then added to precipitate the modified cyclodextrin, and the product was washed with the anhydrous ethanol for 2 times; and
(5) drying: vacuum drying was performed on the purified acid-modified product obtained in step (4) at 50° C. to obtain succinic acid-modified cyclodextrin.

The $^{13}C$ NMR spectrum of the succinic acid-modified cyclodextrin prepared in this comparative example is shown in FIG. 1. It can be observed that the succinic acid-modified cyclodextrin has a new characteristic peak at 16.68 ppm, which means the formation of ester bonds; the characteristic peak related to carboxyl group C in a succinic acid molecule appears at 176.20 ppm, a new peak (at 174.25 ppm) appears in the low field direction of this peak in this comparative example, this peak is a signal peak of the carboxyl group after esterification, and the area ratio of the above two peaks is about 1, indicating that only one carboxyl group in the succinic acid molecule is esterified, and the modified cyclodextrin is not of a cross-linked structure; and in addition, the chemical shift corresponding to the characteristic peak of C atoms No. 6 in the molecular structure of the cyclodextrin moves to the low field, indicating that insufficient modification time will cause a lighter degree of esterification modification.

The XRD spectrum of the succinic acid-modified cyclodextrin prepared in this comparative example is as shown in FIG. 2. It can be seen that slight modification makes the crystallization properties of the cyclodextrin decrease somewhat, but most of the crystallization structure remains.

The embedding capacity of the succinic acid-modified cyclodextrin prepared in this comparative example for guest molecules is shown in FIG. 3. It can be seen that the slightly modified cyclodextrin has a slight improvement in the embedding capacity for guest molecules, the embedding capacity of the slightly modified cyclodextrin is 1.046 times that of the original cyclodextrin. As shown in FIG. 5, after the curcumin-cyclodextrin inclusion complex solution prepared in this comparative example was left standing for 10 days at the room temperature without shielding from light, 35.71% of curcumin still remained in the solution, and under the same conditions, 32.30% of curcumin remained in the original cyclodextrin solution, which indicates that the slightly modified cyclodextrin has no obvious improvement effect on the dispersibility of curcumin in an aqueous solution.

Comparative Example 2

(1) Dissolution: 1 g of β-cyclodextrin, 1 g of succinic acid, and 1 g of sodium hypophosphite were completely dissolved with 10 mL of water;
(2) drying: the dissolved mixed solution obtained in step (1) was dried in an oven at 100° C. for 3 h to obtain a dry reactant;
(3) reaction: there actant dried in step (2) was enabled to react at 140° C. for 60 min to undergo an esterification reaction;
(4) purification: the product obtained after the reaction in step (3) was dissolved with 3 mL of water, 30 mL of anhydrous ethanol was then added to precipitate the modified cyclodextrin, and the product was washed with the anhydrous ethanol for 2 times; and (5) drying: vacuum drying was performed on the purified acid-modified product obtained in step (4) at 50° C. to obtain succinic acid-modified cyclodextrin.

The succinic acid-modified cyclodextrin product prepared in this comparative example has a caramel color, indicating that the reaction time is too long to promote a side reaction, and it is difficult for cyclodextrin molecules to load guest molecules due to the damage to cyclodextrin molecules.

Comparative Example 3

(1) Dissolution: 1 g of β-cyclodextrin, 1 g of citric acid, and 1 g of sodium hypophosphite were completely dissolved with 10 mL of water;
(2) drying: the dissolved mixed solution obtained in step (1) was dried in an oven at 100° C. for 3 h to obtain a dry reactant;
(3) reaction: there actant dried in step (2) was enabled to react at 140° C. for 20 min to undergo an esterification reaction;
(4) purification: the product obtained after the reaction in step (3) was a water insoluble solid, and the product was repeatedly washed with deionized water for 3-4 times; and
(5) drying: vacuum drying was performed on the purified acid-modified product obtained in step (4) at 50° C. to obtain citric acid-modified cyclodextrin.

The citric acid-modified cyclodextrin product prepared in this comparative example is in an insoluble solid state, indicating that citric acid containing three carboxylic acids in the molecule makes the cyclodextrin form a tight cross-linked structure, which is not conducive to its dispersion in a water system. In addition, due to the effect of steric hindrance, it is difficult for guest molecules to enter the cavity of the cyclodextrin. As shown in FIG. 3, the embedding capacity of the citric acid-modified cyclodextrin for the guest molecules is only 0.309 times that of the original β-cyclodextrin, which is significantly lower than that of the original β-cyclodextrin, indicating that citric acid modification not only limits the dispersibility of the cyclodextrin in the water system, but also is not conducive to improving the embedding capacity of the cyclodextrin.

Comparative Example 4

(1) Dissolution: 1 g of β-cyclodextrin, 1 g of malic acid, and 1 g of sodium hypophosphite were completely dissolved with 10 mL of water;
(2) drying: the dissolved mixed solution obtained in step (1) was dried in an oven at 100° C. for 3 h to obtain a dry reactant;
(3) reaction: there actant dried in step (2) was enabled to react at 140° C. for 20 min to undergo an esterification reaction;
(4) purification: the product obtained after the reaction in step (3) was dissolved with 3 mL of water, 30 mL of anhydrous ethanol was then added to precipitate the modified cyclodextrin, and the product was washed with the anhydrous ethanol for 2 times; and
(5) drying: vacuum drying was performed on the purified acid-modified product obtained in step (4) at 50° C. to obtain malic acid-modified cyclodextrin.

The embedding capacity of the malic acid-modified cyclodextrin prepared in this comparative example for guest molecules is shown in FIG. 3. It can be seen that the embedding capacity of the malic acid-modified cyclodextrin for the guest molecules is only 0.770 times that of the original β-cyclodextrin, which is significantly lower than that of the original β-cyclodextrin, indicating that malic acid modification is not conducive to improving the embedding capacity of the cyclodextrin.

Comparative Example 5

(1) Dissolution: 1 g of β-cyclodextrin, 1 g of fumaric acid, and 1 g of sodium hypophosphite were completely dissolved with 10 mL of water;
(2) drying: the dissolved mixed solution obtained in step (1) was dried in an oven at 100° C. for 3 h to obtain a dry reactant;
(3) reaction: there actant dried in step (2) was enabled to react at 140° C. for 20 min to undergo an esterification reaction;
(4) purification: the product obtained after the reaction in step (3) was dissolved with 3 mL of water, 30 mL of anhydrous ethanol was then added to precipitate the modified cyclodextrin, and the product was washed with the anhydrous ethanol for 2 times; and
(5) drying: vacuum drying was performed on the purified acid-modified product obtained in step (4) at 50° C. to obtain fumaric acid-modified cyclodextrin.

The embedding capacity of the fumaric acid-modified cyclodextrin prepared in this comparative example for guest molecules is shown in FIG. 3. It can be seen that the embedding capacity of the fumaric acid-modified cyclodextrin for the guest molecules is only 0.819 times that of the original β-cyclodextrin, which is significantly lower than that of the original β-cyclodextrin, indicating that fumaric acid modification is not conducive to improving the embedding capacity of the cyclodextrin.

Comparative Example 6

(1) Dissolution: 1 g of β-cyclodextrin, 1 g of tartaric acid, and 1 g of sodium hypophosphite were completely dissolved with 10 mL of water;
(2) drying: the dissolved mixed solution obtained in step (1) was dried in an oven at 100° C. for 3 h to obtain a dry reactant;
(3) reaction: there actant dried in step (2) was enabled to react at 140° C. for 20 min to undergo an esterification reaction;
(4) purification: the product obtained after the reaction in step (3) was dissolved with 3 mL of water, 30 mL of anhydrous ethanol was then added to precipitate the modified cyclodextrin, and the product was washed with the anhydrous ethanol for 2 times; and
(5) drying: vacuum drying was performed on the purified acid-modified product obtained in step (4) at 50° C. to obtain tartaric acid-modified cyclodextrin.

The embedding capacity of the tartaric acid-modified cyclodextrin prepared in this comparative example for guest molecules is shown in FIG. 3. It can be seen that the embedding capacity of the tartaric acid-modified cyclodextrin for the guest molecules is only 0.536 times that of the original β-cyclodextrin, which is significantly lower than that of the original β-cyclodextrin, indicating that tartaric acid modification is not conducive to improving the embedding capacity of the cyclodextrin.

Although the present disclosure is disclosed above with preferred examples, it is not intended to limit the present disclosure. Anyone familiar with this technology can make various changes and modifications without departing from the spirit and scope of the present disclosure. Therefore, the scope of protection of the present disclosure shall be subject to those defined in the Claims.

What is claimed is:

1. A preparation method of green acid-modified cyclodextrin, wherein the method comprises using succinic acid, cyclodextrin and catalyst as raw materials, and uniformly mixing the raw materials by mixing the cyclodextrin, the succinic acid and the catalyst evenly to obtain a mixture, carrying out a dry-heat reaction of the mixture obtained in previous step at a high temperature of 120-180° C. for 5-50 minutes or under a microwave action condition with a microwave power of 160-800 W for 15-600 seconds, purification by dissolving product obtained in previous step with water, then adding anhydrous ethanol to precipitate the acid-modified cyclodextrin, and washing, and drying so as to obtain the acid-modified cyclodextrin; wherein the cyclodextrin is α-, β-or γ-cyclodextrin, and the catalyst is sodium hypophosphite or sodium dihydrogen phosphate.

2. The preparation method of the green acid-modified cyclodextrin according to claim 1, wherein the molar ratio of the cyclodextrin to the succinic acid is 1:1-1:10.

3. The preparation method of the green acid-modified cyclodextrin according to claim 1, wherein the amount of the catalyst added is 10%-200% of the mass of the cyclodextrin.

4. The preparation method of the green acid-modified cyclodextrin according to claim 2, wherein the amount of the catalyst added is 10%-200% of the mass of the cyclodextrin.

5. The preparation method of the green acid-modified cyclodextrin according to claim 2, wherein in the step of uniformly mixing the raw materials, the cyclodextrin, the succinic acid, and the catalyst are dissolved in water and mixed evenly to obtain a mixed solution, and then the mixed solution is dried to obtain a mixture of the cyclodextrin, the succinic acid and the catalyst, wherein the drying environment is 60-105° C., and the drying time is 1-24 hours.

6. The preparation method of the green acid-modified cyclodextrin according to claim 3, wherein in the step of uniformly mixing the raw materials, the cyclodextrin, the succinic acid, and the catalyst are dissolved in water and mixed evenly to obtain a mixed solution, and then the mixed solution is dried to obtain a mixture of the cyclodextrin, the succinic acid and the catalyst, wherein the drying environment is 60-105° C., and the drying time is 1-24 hours.

* * * * *